(12) United States Patent
Guru et al.

(10) Patent No.: US 8,571,904 B2
(45) Date of Patent: Oct. 29, 2013

(54) SELF SENSING COMPONENT INTERFACE SYSTEM

(75) Inventors: Arun K. Guru, Germantown, WI (US); Aleksey Yegorov, Mequon, WI (US); Robert Harris Schmidt, Germantown, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1337 days.

(21) Appl. No.: 12/028,748

(22) Filed: Feb. 8, 2008

(65) Prior Publication Data
US 2009/0204232 A1    Aug. 13, 2009

(51) Int. Cl.
*G06Q 10/00*    (2012.01)
(52) U.S. Cl.
USPC .......................................................... 705/7.11
(58) Field of Classification Search
None
See application file for complete search history.

(56) References Cited

U.S. PATENT DOCUMENTS

| | | | |
|---|---|---|---|
| 6,925,418 B2 * | 8/2005 | Fujiyama et al. | 702/184 |
| 7,149,655 B2 * | 12/2006 | Frederick et al. | 702/182 |
| 7,208,955 B2 * | 4/2007 | Zansky et al. | 324/418 |
| 7,873,441 B2 * | 1/2011 | Synesiou et al. | 700/286 |

* cited by examiner

*Primary Examiner* — Paul Danneman
(74) *Attorney, Agent, or Firm* — Turocy & Watson, LLP; Scott Speroff; John M. Miller

(57) ABSTRACT

The subject innovation provides for systems and methods to optimize control systems for networked industrial sensors or devices and methods for self sensing, communicating with, monitoring of, controlling and optimizing utilization of networked industrial sensors and related control systems primarily in an industrial automation environment. The invention provides self-sensing and communication with sensors, and integration of control methods and strategies with decision support and logistics systems, to optimize specifically defined operational and performance objectives.

18 Claims, 10 Drawing Sheets

SELF SENSING COMPONENT INTERFACE SYSTEM

TECHNICAL FIELD

The present invention relates to the art of networked industrial sensors and control systems (e.g., networked industrial process-line interlock systems and components thereof) and more particularly to control systems and methods for self-sensing, communicating with, monitoring of, controlling and optimizing utilization of networked industrial sensors and related control systems primarily in an industrial automation environment. The invention provides self-sensing and/or communication with sensors, and integration of control methods and strategies with decision support and logistics systems, to optimize specifically defined operational and performance objectives.

BACKGROUND OF THE INVENTION

The global economy has forced many businesses to operate and conduct business in an ever increasingly efficient manner due to increased competition. Accordingly, inefficiencies that were once tolerated by corporations, due to a prior parochial nature of customers and suppliers, now have to be removed or mitigated so that the respective corporations can effectively compete in a vastly more dynamic marketplace.

Many industrial processes are subject to sensor controlled interlock systems and optimization of process line "uptime" through input from numerous other sensors associated either directly or indirectly with the process line. Such sensors may monitor environmental conditions, fans, conveyor systems, compressors, gear boxes, motion control devices, electric motors, pumps, and mixers, as well as hydraulic and pneumatic machines driven by motors. Further, such sensors frequently monitor the human interface components of process lines and may control process line interlocks (e.g., they may interrupt or halt an active production line, or prevent the startup of a production line, based on an operator or worker's actions, or process line or environmental conditions, in relation to sensors associated directly or indirectly with the process line). For example, machines and plant environments can endanger the life and health of personnel and improved sensors can reduce the exposure of personnel to such risks.

Often, sensors and other devices in an industrial process must meet certain compliance requirements to provide long term functionality of the process line. Further, where sensors are employed in critical applications, for example worker safety sensors and/or devices, these sensors can be held to stringent compliance requirements. Sensors or devices that fail to meet these compliance requirements (e.g., noncompliant sensors or devices) may result in failure of a process line to start-up where a noncompliant sensor or device is connected to a process line interlock, cause damage to the process line either by causing the process line to run outside of acceptable parameters or by direct damage to the process line (e.g., the noncompliant device causes a power spike on a system bus damaging other electrical components, the noncompliant device causes a repetitive stress injury to a process line worker interacting with the device, etc.), cause failures of products produced on or associated with a process line associated with the noncompliant device (e.g., a noncompliant temperature sensor on a chemical process line may change the reaction temperature by providing erroneous temperature readings resulting in no damage to the process line but resulting in a chemical product that is dangerous or otherwise outside of acceptable product parameters, etc.), other unacceptable conditions, or combinations thereof among others. Ensuring that a sensor or device associated with the process line is compliant is of significant importance in light of the high cost of infrastructure, reliable products meeting production specifications, efficiency of the process line or the business objectives of a business entity, minimizing down-time of a process line or business entity relying on a process line and facilitating a safer working environment.

Further, such sensors are combined with other system components, such as valves, pumps, furnaces, heaters, chillers, conveyor rollers, fans, compressors, gearboxes, and the like, as well as with appropriate motor drives, to form industrial production lines. For example, a break press workstation may be combined with a pressure sensor to ensure that a worker is in the proper position to operate the break press on the production line, as well as with several other sensors monitoring the position of work pieces entering and exiting the break press to ensure that the work pieces are properly positioned for operation of the break press, whereby the failure of any sensor, use of an incompatible sensor, or worse, the intentional bypassing of a sensor, may result in a failure of the process (e.g., damaging work pieces, the break press itself, the operator or bystanders, and may result in extended and expensive downtime of the entire associated process line).

The sensors incorporated into such process line systems (e.g., interlock sensors, environmental sensors, area sensors, process condition sensors, zone protection sensors, among many others) are commonly chosen according to specifications for a particular application or process in which the sensor or sensor system is to be employed. For example, a risk analysis of a process line can be carried out to identify hazards, assessment of hazards and techniques to reduce the acceptable residual risk. Some of the common hazards of machines can include, among others, mechanical hazards, electrical hazards, thermal hazards, hazards by noise, vibration, radiation, material and other substances, hazards posed by non-ergonomic design related issues. Appropriate sensors and/or devices can be selected to help achieve a desired machine or process line fault tolerance and level of safety according to relevant directives and standards, such as, operator position, vibration levels temperatures, production levels, speeds, pressures, fume levels, ruggedness, mean time between failure (MTBF) levels, or combinations thereof, among other criteria or metrics.

While the operating specifications for the sensor system components may provide for component device selection to achieve one or more system operational maxima (e.g., temperatures, caustic chemical resistance, etc.), other performance metrics (e.g., efficiency, cost, lifetime, MTBF, sensor degradation, etc.) for the components and/or the system of which they form a part, are not typically optimal. For example, even where a sensor may be replaced with an identical sensor upon failure, the replacement may not be optimal where an improved replacement sensor has become available. A second example is that a sensor is repeatedly failing at 50% of the claimed MTBF period indicating that either the sensor is from a substandard manufacturer or that the environmental conditions of the sensor are not what they were thought to be. The cost of replacing a sensor that impacts a production line is not just the cost of the sensor itself, rather it must include the cost of lost production and exposure to risk for production line workers. Repeated replacement of sensors with substandard components, inoperative components, or improper components, is likely inefficient and costly. These issues may be magnified where single vendor sensor system component selection is not desirable from a cost or availability standpoint. Purchasing sensor system components from discrete vendors may reduce costs to the production line owner but correspondingly may increase costs for determining which vendor's product has failed, designing a metric system for comparing components from separate vendors, and management costs of replacements components. Thus, separate selection of components based on cost or individual efficiencies may result in an integrated system that is sub-optimal with regard to efficiency, throughput, or other optimization criteria.

Moreover, typically, the specification for such machines or components thereof is performed at an isolated level or level of granularity such that higher-level aspects of a business or industrial concern are overlooked. Thus, there is a need for methods and systems by which, compliance, efficiency, and other performance characteristics associated with selecting and utilizing control systems and methods for self-sensing and communication with sensor systems and components thereof may be improved.

SUMMARY

The following presents a simplified summary of the subject innovation in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The disclosed subject matter provides for determining if devices or systems intended to be integrated with an existing system satisfy compliance requirements (e.g., where the system is a safety system, compliance requirements can include standards such as EN954-1, EN ISO 13849-1, IEC61508, IEC/EN62061, . . . ). An electronic signature associated with the new device or system is identified and analyzed, and if the analysis deems the device or system compliant, it is allowed to be integrated with the existing system. If the analysis does not deem the device or system compliant, further testing or analysis can be performed to assess compliance. If after the analysis is complete, the device or system is not compliant it is not permitted to be integrated with the system.

The invention provides control systems and methodologies for controlling a process having one or more sensors or other devices associated with a process line, which provide for optimized process performance according to one or more performance criteria, such as efficiency, component life expectancy, lower cost or better performing sensors from differing manufacturers meeting minimum sensor or device specifications (e.g., compliant sensors or devices), maximizing process line "uptime" by monitoring sensor performance for real-time or predictive analysis degradations, providing datum for analysis of optimum replacement windows, or the like. Additionally, the compliance of a sensor or device can be more easily assessed by analyzing data or handshakes ascertained from a sensor or device associated with a process line. More particularly, the subject invention provides for employing machine diagnostic and/or prognostic information in connection with optimizing an overall business operation. Thus, the present invention abstracts sensor or device data so that it can be employed in connection with optimizing overall business operations as compared to many conventional systems that employ sensor or device data solely in connection with machine maintenance.

The aforementioned novel features of the subject invention can be employed so as to optimize an overall business commensurate with set business objectives. Moreover, as business needs/objectives change, the invention can provide for dynamic adjustment and/or modification of sub-systems (e.g., sensors and devices, business components, configurations, process steps, etc.) in order to converge toward the new operating mode that achieves the business objective in an optimum manner. Thus, the subject invention ascertains and abstracts sensor or device data (e.g., compliance data, diagnostic and/or prognostic data and sensory output) and employs such data not only in connection with optimizing process line utilization at a low level, but also to maximize utilization of a process line given constraints associated with high-level business objectives. Various models including simulation models, rule-based system, expert systems, or other modeling techniques may be used to establish the range of possible operating conditions and evaluate their potential for optimimizing process line operation.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
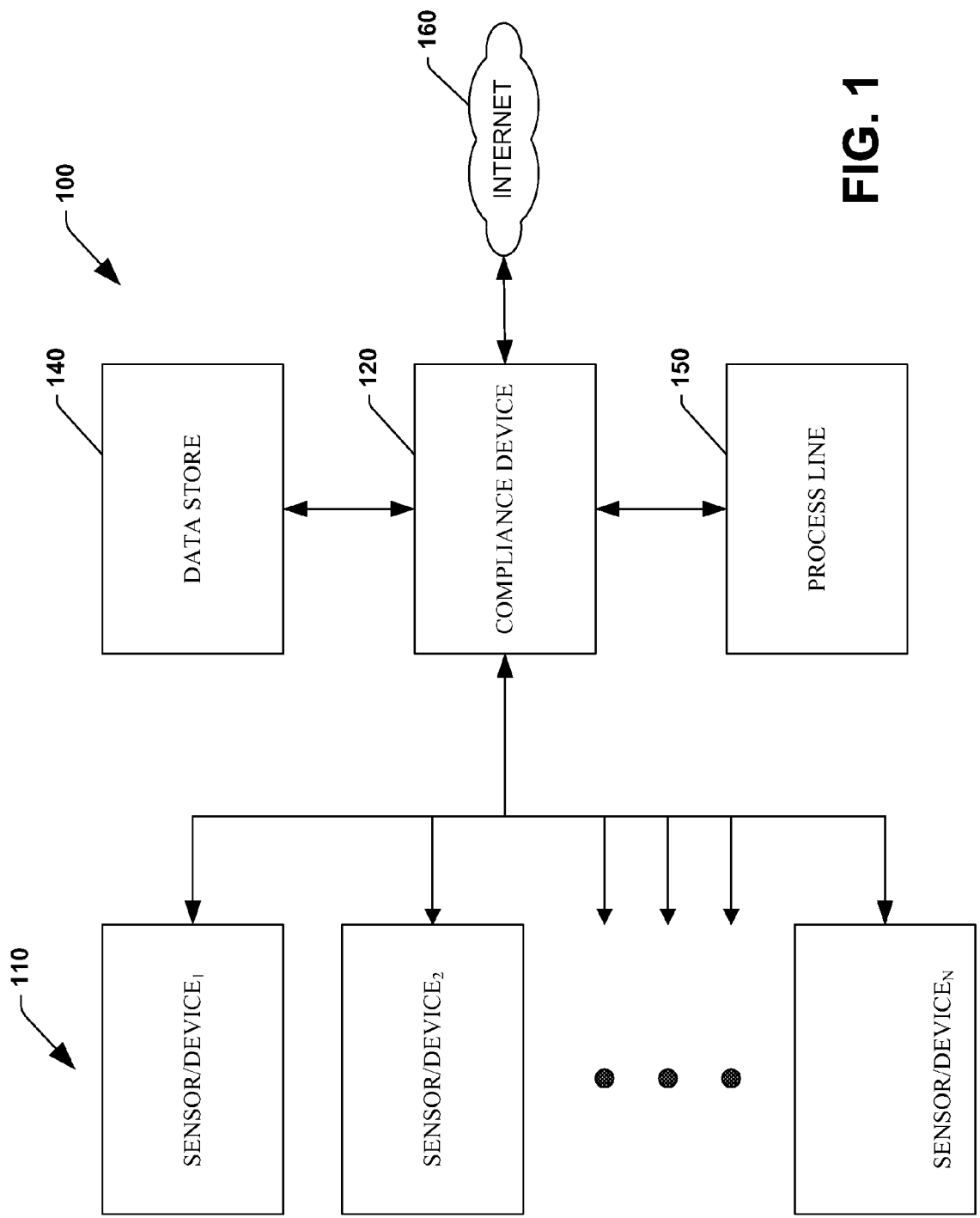
FIG. 1 is a high level diagram of a system in accordance with the subject invention.

The subject innovation is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component," "handler," "model," "system," and the like are also intended to refer to a computer-related entity, either hardware, a combination of hardware and software, software, or software in execution, in addition to electro mechanical units. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

The subject invention provides for system(s) and method(s) relating to employing sensor or device data in connection with optimizing an overall system or process. The sensor or device data can be collected dynamically (e.g., in the form of diagnostic data or control data) and/or generated in the form of prognostic data relating to future sensor or device state(s). The sensor or device data can be collected and/or generated in real-time (e.g., in situ, dynamically, without significant lag time from origination to collection/generation). The sensor or device data can be analyzed and the analysis thereof employed in connection with optimizing machine utilization as well as other business components or systems (e.g., accounting, inventory, marketing, human resources, scheduling, purchasing, maintenance manufacturing . . . ) so as to facilitate optimizing an overall business objective or series of objectives or concerns.

The invention provides methods and systems for controlling a sensor or device system in order to optimize one or more performance characteristics associated with the system while operating within specified operating constraints. The invention is hereinafter illustrated with respect to one or more sensor or device systems and controls therefore. However, it will be appreciated that one or more aspects of the invention may be employed in operating other sensor or device systems, including but not limited to sensors or devices operating in self-sensing modes, single or multiple sensor or device processes, single or multiple process line control systems, and distributed process line control systems.

In addition, the attached figures and corresponding description below illustrate the invention in association with optimizing system and/or component efficiency, although it will be recognized that other performance characteristics of a sensor or device system may be optimized individually or in combination, which performance characteristics may include, but are not limited to, life cycle cost, efficiency, life expectancy, human health factors, throughput, emissions, operational cost, MTBF, noise, vibration, energy usage, and the like. Furthermore, the aspects of the invention may be employed to provide for optimization at a higher system level, wherein a process comprises a plurality of sensor or device systems as part of an overall automation system such that one or more performance characteristics of the entire process are optimized globally. Moreover, as discussed herein, aspects of the invention can be employed in connection with optimizing many higher level systems (e.g., business-based system). The higher-level system optimization may prescribe not operating at an optimum efficiency point with regard to single process or process line utilization. Rather, a more important, overarching objective such as maximizing revenue generation may supersede more narrow, limited scope objectives of achieving the most efficient usage of existing process or process line resources. The subject invention employs a performance driven approach to leverage off developments in diagnostic and prognostic algorithms, smart process line components, novel uses of existing sensor or device technologies, new sensor or device technologies, smart sensors or devices, and integrating these technologies among others in a framework of an enterprise-wide asset management (EAM) system. The combination of optimizing methods and processes in the framework of an EAM system comprise an Asset Optimization System.

In addition to maintenance and repair costs, consideration for issues such as operational impact, business strategy, and supply chain (e.g., connected supplier-manufacturer-customer) issues are also considered. There are several compelling business drivers that often make cost-effective sensor or device reliability and management not only economically sound, but also a business imperative. These recent business drivers include greater concern for protecting the environment, ultimate concern for worker well-being, connected (e.g. virtual) organizations, make-to-order operating strategy, pay-for-performance (e.g. power-by-the-hour), containing warranty costs, and competitive time-based performance with greater scrutiny and expectations in a rapidly expanding e-business world.

Although, the subject invention is primarily described in connection with sensors or devices in use in industrial process line systems, it is emphasized that the subject invention applies directly to other commercial and industrial sensor or device systems. These systems could include for example a plant HVAC system, a conveyor system, a semi-conductor fabrication line, chemical processing (e.g. etching processes) or other continuous process systems, or monitoring systems such as environmental monitoring for natural events (e.g. flood or earthquake sensing), or human influenced events (e.g. chemical releases into streams or terror related events monitoring). Providing overall asset optimization as proposed herein can require integrating and optimizing other sensor or device components in a plant. The scope of the subject invention as defined by the hereto appended claims is intended to include all such embodiments and applications.

FIG. 1 is a high level diagram of one particular system 100 in accordance with the subject invention. The system includes a plurality of sensors or devices 110 (SENSOR/DEVICE$_1$ through SENSOR/DEVICE$_N$, N being an integer) each of which is operatively coupled in a manner to share data with a compliance device 120. Where more than one sensor or device is present, these sensors or devices may be operatively coupled to one or more of these other sensors or devices in a manner to share data between each other as well as with the compliance device 120. It is to be appreciated that individual sensors or devices do not have to be of the same type, model, manufacturer, or format as any other sensor or device of the plurality of sensors or devices 110.

Each of the plurality of sensors or devices 110 may contain additional circuitry that is not directly the subject of the present invention, however, data that could be provided to the subject invention enabled by additional sensor or device functionality should be considered generally as subject matter of the present invention where this data may be monitored, analyzed, or used in predictive analysis and be thereby incorporated into a control system for process(es) monitored by the plurality of sensors or devices 110. Further, a sensor or device may be exceedingly simple, for example a mechanical switch or contact sensor, whereby the operative coupling to share data with the compliance device 120 may be as simple as a single or paired electrical conductor. Moreover, advanced sensors and devices may require more advanced operative couplings, for example fiber-optic connections, wireless connections, USB-type connections, or Ethernet-type connections, among others, to share data with the compliance device 120. However, even where an advanced sensor or device may be able to share more or better data with an advanced operative coupling to the compliance device 120, the present invention does not necessitate sharing all data between the sensor or device and the compliance device 120, any data shared between the sensor or device and the compliance device 120 is sufficient to be considered within the scope of the present invention (e.g., incomplete or limited data sharing is considered by the inventor to be with the scope of the present invention.)

The compliance device 120 may or may not be communicatively coupled to an external data store 140 or to the internet 160. One embodiment of the present invention envisions operation of the compliance device in a standalone manner wherein, the compliance device 120 may communicate with or receive data from the plurality of operatively coupled sensors or device 110 and at least a default analysis may be conducted without requiring external resources, for example a determination of sensor or device process line or system compliance, among others. However, where an external data source 140 is communicatively coupled to the compliance device additional, functionality is envisioned. Similarly, where the compliance device is communicatively coupled to the internet 160, additional functionality is envisioned.

These additional functionalities of the subject invention employ various high-level data analysis, modeling and utilization schemes in connection with providing some of the advantages associated with the invention. For example, Bayesian Belief Networks can be employed in connection with the subject invention. A probabilistic determination model and analysis can be performed at various levels of data to factor the probabilistic effect of an event on various business concerns given various levels of uncertainty as well as the costs associated with and making an incorrect inference as to prognosing an event and its associated weight with respect to the overall business concern.

The present invention takes into consideration that the benefits of sensor or device monitoring and condition based maintenance may be significantly enhanced by integrating real time diagnostics and prognostics techniques within the framework of an automatic control system. System operation may be prescribed based on the predicted or probabalistic state or condition of the sensor or device in conjunction with the anticipated workload or demand or probabalistic demand along with other operational and performance constraints. The generated decision space may be evaluated to insure that suitably robust decisions are made that maximize the specified business objective such as revenue generation or life cycle cost by maximizing process line "uptime" by selecting an optimum window for degraded sensor or device replacement in conjunction with predicted or expected periods in which the process line is not running. Thus the subject invention integrates prognostics with control linked business objectives and strategies to provide unique opportunities for dynamically compensating control and ultimately for managing and optimizing system asset utilization.

Moreover, it is to be appreciated the subject invention can be employed in connection with initial specification, layout and design of an industrial automation system (e.g., process, factory) such that high-level business objectives (e.g., expected revenue, overhead, throughput, growth) are considered in connection with predicted sensor or device characteristics (e.g., life cycle cost, maintenance, downtime, health, efficiency, operating costs) so as to converge on specifications, layout, and design of the industrial automation system so that a mapping to the high-level business objectives is more closely met as compared to conventional schemes where such layout and design is performed in more or less an ad hoc, manual and arbitrary manner. Further, continued use of analytics of sensor or device performance under actual operating conditions may be later integrated at retooling or development of additional facilities. Integrating information regarding opportunities for real-time prognostics and optimizing control can influence the initial design and configuration of the system to provide additional degrees of freedom and enhance the capability for subsequent prognostics and optimizing and compensating control.

Wherein the compliance device 120 is operating in a standalone mode, a full complement of communications with, or data monitoring from, the plurality of sensors or devices 110 may be combined with a default analysis or user programmed analysis of sensor or device data. For example, when operatively coupled to a very basic sensor such as a switch, the compliance device 120 may communicate a test signal (e.g., a waveform, among others) that may be communicated back to the compliance device 120 by the switch device over the operative coupling (e.g., a two conductor connector or a wireless communications channel, among others). The compliance device 120 may then analyze the returned signal against the sent signal to determine if the sensor is compliant with either a default or user programmed analysis as a compliant device, a very basic form of self-sensing technology. Other means of determining compliance may also be employed, such as self-sensing of Output Signal Switching Device (OSSD) sensors or devices among others.

Discussing at least one aspect of the invention at a more granular level, solely for sake of understanding one particular context of the invention, a sensor may be attached to a standalone mode compliance device (SACD) having parameters, for example, as specified in Tables 1 to 3. The parameters presented in Tables 1-3 are presented only as exemplary, non-limiting examples and should not be so construed as to limit any embodiment of the disclose subject matter to the presented parameters. One of skill in the art will appreciate that parameters, such as those presented here, are widely variable and application specific and that any and all sets of parameters that facilitate aspects of the disclosed subject matter are to be considered within the scope of the disclosed subject matter. The SACD may then, for example, propagate a test query signal to a communicatively coupled sensor or device, such as a light curtain for example. The sensor or device may be, for example, of a dry contact or OSSD character and have no other higher level functionality. The self-sensing mode of the compliance component can then, for example, analyze the signal returned from the sensor or device to determine if there is ground fault, power rail fault, determination of a dry contact or OSSD character of the device, and self test the compliance device to ensure that an internal failure of the compliance device is not occurring, or some combination thereof among others. The results of these analyses could then be incorporated into a determination such as signaling for a halt of the process line, setting an alarm, logging the data, requesting other actions, or some combination thereof among others.

TABLE 1

Safety Input Specifications

| Parameter | Description |
|---|---|
| Input Types Supported | Software selectable as: Dual Channel Equivalent OSSD (Output Signal Switching Device) |
| Input Current @ 24 V | 12.4 mA |
| ON State Input Voltage | 14.2 V |
| OFF State Input Voltage | 10.65 V |
| Input Pulse Testing | With OSSD Connected: Pulse Width 100 µSec(Min) to 500 µSec(Max) Pulse Period: 10 mSec(min) to 500 mSec(max) |

TABLE 2

Safe Stop Safety Output Specifications

| Parameter | Description |
|---|---|
| Output Type | Solid State, PNP, Dual Channel |
| Pulse Testing | 250 µSec pulse every 200 mSec |
| ON State Current | 100 mA(max) |
| OFF State Current | 100 uA(max) |
| ON State Voltage | Power Supply Input Voltage |
| OFF State Voltage | 1.4 V(max w/o load connected) |
| Power Supply Input Voltage | 19.2 VDC to 28.8 VDC |

TABLE 3

Test Output Specifications

| Parameter | Description |
|---|---|
| Output Type | Solid State, Totem Pole, Dual Channel |
| Sense | Selectable from: Power to Release or Power to Lock |
| Pulse Testing | 250 µSec Pulse every 250 mSec |
| ON State Current | 100 mA(max) |
| OFF State Current | 10 µA(max) |
| ON State Voltage | Power Supply Input Voltage |
| OFF State Voltage | 1 V(max) |
| Power Supply Input Voltage | 19.2 VDC to 28.8 VDC |

Continuing with the discussion of the at least one aspect of the invention at a more granular level, solely for sake of understanding one particular context of the invention, in a most simplistic example, a light curtain with OSSD character may be connected to a SACD (coupled to a process line emergency stop function). Wherein the SACD may determine that the SACD is functioning properly (e.g., the SACD passes an internal self test of components such as power levels, ground levels, and opto-coupler functionality, etc.). Further, the SACD may determine by, for example, sending a square wave waveform test signal and verifying that a monitor on the output terminal indicates that the signal sent is sufficiently similar to the intended signal to be sent, that the test signal output of the SACD is not faulted to either ground or power.

A next step in this simplistic example would be to determine if the return signal from the light curtain is sufficiently similar to the test signal sent, indicating that a dry contact type device may be present. In this case, where the light curtain is an OSSD device, the return signal would not be sufficiently similar and a flag may be set that a dry contact character device is not communicatively coupled to the SACD. The SACD may then execute, for example, a frequency analysis of the returned signal to determine if the signal is sufficiently compliant with an OSSD signal (see for example Table 1—Input Pulse Testing parameter above) whereby an OSSD compliance flag may be set. If the exemplary OSSD character light curtain device provides a compliant OSSD signal the SACD may for example set the OSSD character flag positive and not trigger a process line emergency stop function, thereby allowing the process line to start up after new installation of the light curtain device or not halting the process line where the light curtain device is functioning in an operating process line.

Continuing with this simplistic example, the compliance device may continue to monitor the light curtain for noncompliant data. An example of noncompliance may be for instance that the light curtain has internal damage that pulls the OSSD output down, whereby the frequency test would fail and an emergency stop of the process line may be effected to prevent operation of the process line with a faulty and noncompliant light curtain. A second example of a noncompliant device, wherein the compliance device may halt a process line, may be the installation of a properly operating light curtain device wherein the installer has bypassed and grounded out the compliance device test signal input to defeat a safety interlock. While these extraordinarily simplified examples of determining device compliance have been provided, the subject invention is not limited to such simplistic and basic functionality and many more advanced examples of compliance analysis, signal analysis, and communicatively coupled sensor and device functionality is to be considered within the scope of the present invention as is herein disclosed and claimed.

Leaving the simplistic example provided herein above, where the compliance device 120 is operating in standalone mode and coupled to a more advanced sensor or device, the full complement of communications and analysis modes may attempt to send a test signal as above where there is no connection to a test signal output or where an unsolicited signal is received at a signal input of the compliance device 120, the default or user programmed analysis of this signal may indicate a compliant non-dry contact device, a compliant OSSD (e.g., an Output Signal Switching Device), or a compliant device with more advanced data communication capabilities. Additional stand alone functionality may include cyclic testing for compliance, data logging (e.g., FIFO data logging, connection to an external data logging device, etc.), or interacting with external systems such as safe-stop function of a process line 150 or triggering of warning systems (e.g., warning lights, alarms, fire systems triggering, etc.), among others.)

Where the compliance device 120 is communicatively coupled to an external data store 140, additional functionality is envisioned. The data store 140 may function as additional data storage for data logging functions. Further, additional analysis modes, device identification and compliance protocols, business goals, accounting information, maintenance scheduling systems data, replacement part order inventory data, MTBF data, device statistics, user accessible functionality, process line data, other business concerns, or combinations thereof, among others, may be stored and accessible to the compliance device on the data store 140.

Similarly, where the compliance device 120 is communicatively coupled to the internet 160, additional functionality is envisioned. All of the functionality of the data store 140 may be duplicated though an internet connection to a remote data store. However, by communicatively coupling the compliance device 120 to the internet 160, real time monitoring of the compliance device 120 and the analysis of sensor and device data may be remotely monitored. Further, the compliance device 120 may be programmed to access the internet to search for compliance signals from sensors or devices that produce unrecognized compliance data. These searches may include searched of predefined manufactures websites, compliance signal clearinghouse websites, or general searches. In addition, remote programming, update, diagnostic and other functionality may be implemented on the compliance device 120 by users through an internet (or network) type connection 160.

Within the implementation of the system in accordance with the subject invention as illustrated in FIG. 1, the predicted operating state(s) of the sensors or devices may be determined based on expected demand or workload or a probabalistic estimate of future workload or demand. Sensor or device data can be employed in connection with predicted process line activity, overall production goals, lower cost or more efficient or effective sensors or devices from a plurality of sensor or device manufacturers, device in use analysis for calculations of actual failures against MTBF predictions, and other business concerns. Similarly, expected environment (e.g. temperature, pressure, vibration, . . . ) information and possible expected damage information may be considered in establishing the predicted future state of the system. Undesirable future states of the system may be avoided or deferred through a suitable replacement, repair, upgrading, or added redundancy in the plurality of sensors or devices 110 while achieving required operating objectives and optimizing established operational and business objectives.

Moreover, it is to be appreciated that data relating to subsets of the sensors or devices can be aggregated so as to provide for data relating to clusters of sensors or devices—the cluster data can provide for additional insight into overall system performance and optimization. The clusters may represent sub-systems or logical groupings of sensors or devices along a process line or functionality of a cluster of sensors or devices. This grouping may be optimized as a collection of process entities. Clusters may be dynamically changed based on changing operating requirements, sensor or device conditions, or business objectives. The compliance device 120 may include an enterprise resource planning (ERP) component that facilitates analyzing the sensor or device data as well as data relating to the business concern components (e.g., utilities components, processes components, accounting components, manufacturing goals components, etc.) The data is analyzed and the compliance device 120 may execute various optimization programs to identify configurations of the various components so as to converge more closely to a desired business objective. For example, assume a current business objective is to operate in a just in time (JIT) manner and reduce costs as well as satisfy customer demand. If the inventory component indicates that finished goods inventory levels are above a desired level, the ERP component might determine that it is more optimal given the current business objective to run the process line at 60% rather than 90% which would result in less wear on sensors or devices and associated machinery, or that the process line may be shut down for service of sensors or devices or other regular maintenance as indicated in a maintenance component thereby reducing overall labor and repair parts costs. This will also result in reducing excess inventory over a prescribed period of time as well as increasing life expectancy of the sensors or devices and machines of the process line as a result of operating the process lines at a reduced working rate.

Maintenance, repair, and overhaul (MRO) activities are generally performed separate from control activities. Interaction and collaboration between these functions are typically limited to the areas of operations scheduling and to a lesser extent in equipment procurement—both are concerned with maximizing production throughput of the process machinery. Information from MRO systems and from machinery control and production systems are related and can provide useful information to enhance the production throughput of process equipment. The subject invention leverages off opportunities realized by closely coupling sensor or device health (e.g. diagnostics) and anticipated health (e.g. prognostics) information with real-time automatic control. More importantly, it is possible to change how the system is controlled, within certain limits, to alter the rate of sensor or device degradation or stress. Using real-time diagnostic and prognostic information the subject invention can be employed in connection with altering future state(s) of the process line and thus impact the survival of the sensor or device. This future operating state can be specified to be an improved state over that which would occur if one did not alter the control based on sensor or device health information. Furthermore, the future state achieved could be optimal in some manner such as improving sensor or device mean time before failure (MTBF) for example.

With respect to asset management, it is to be appreciated that the system 100 may determine for example that purchasing several more advanced sensors as compared to replacement of failed sensors with identical parts may be more optimal given a particular set of business objectives.

It is also to be appreciated that the various sensors or devices 110 or business components accessed either internally or externally by the compliance device 120 or a subset thereof can be located remotely from one another. The various sensors or devices 110 and/or components can communicate by wireless or wired networks (e.g., internet 160). Moreover, the subject invention can be abstracted to include a plant or series of plants with wireless or wired networked equipment that are linked via long distance communications lines or satellites to remote diagnostic centers and to remote e-commerce, distribution, and shipping locations for dynamic logistics integrated with plant floor prognostics and control. Thus, optimization and/or asset management in connection with the subject invention can be conducted at an enterprise level wherein various business entities as a whole can be subcomponents of a larger entity. The subject invention affords for implementation across numerous levels of hierarchies (e.g., individual sensor or device, cluster of sensors or devices, sensors or devices on a single process, sensors or devices for an overall business unit, overall division, parent company, consortiums, etc.)

The invention thus provides for maximization of efficiency of a process line, wherein operation thereof takes into account desired process performance, such as replacing degraded sensors or devices during periods where the process line may be down for other routine maintenance (e.g., replacing a functioning sensor upon aging to the MTBF at an employee shift change), determining which sensors or devices may be in need of maintenance or ready for replacement based on predictive analysis or real time diagnostics, replacement of sensors or devices where improved or more cost effective sensors or devices may have become available (e.g., the system may monitor a sensor or device manufacturer or alternate sensor or device manufacturer for improved versions of a sensor or device in the process line and determine the feasibility, for example as a function of time, of upgrading the sensor or device with the new sensor or device), continued operation of a process line based on desired business objectives where redundant sensors or devices allow continued operation of the process line despite the failure of one or more of the redundant sensors or devices, and increases or decreases in process line performance in conjunction with the performance condition of a sensor or device in place on the process line (e.g., a process line with a degraded but not failed proximity sensor may be allowed to run at 50% productivity rather than immediately stopping production to replace the sensor, allowing the sensor to be replaced at an employee shift change whereafter the process line returns to 100% efficiency, thus according with business objectives) by consideration of prognostic and optimization data.

Figure 2:
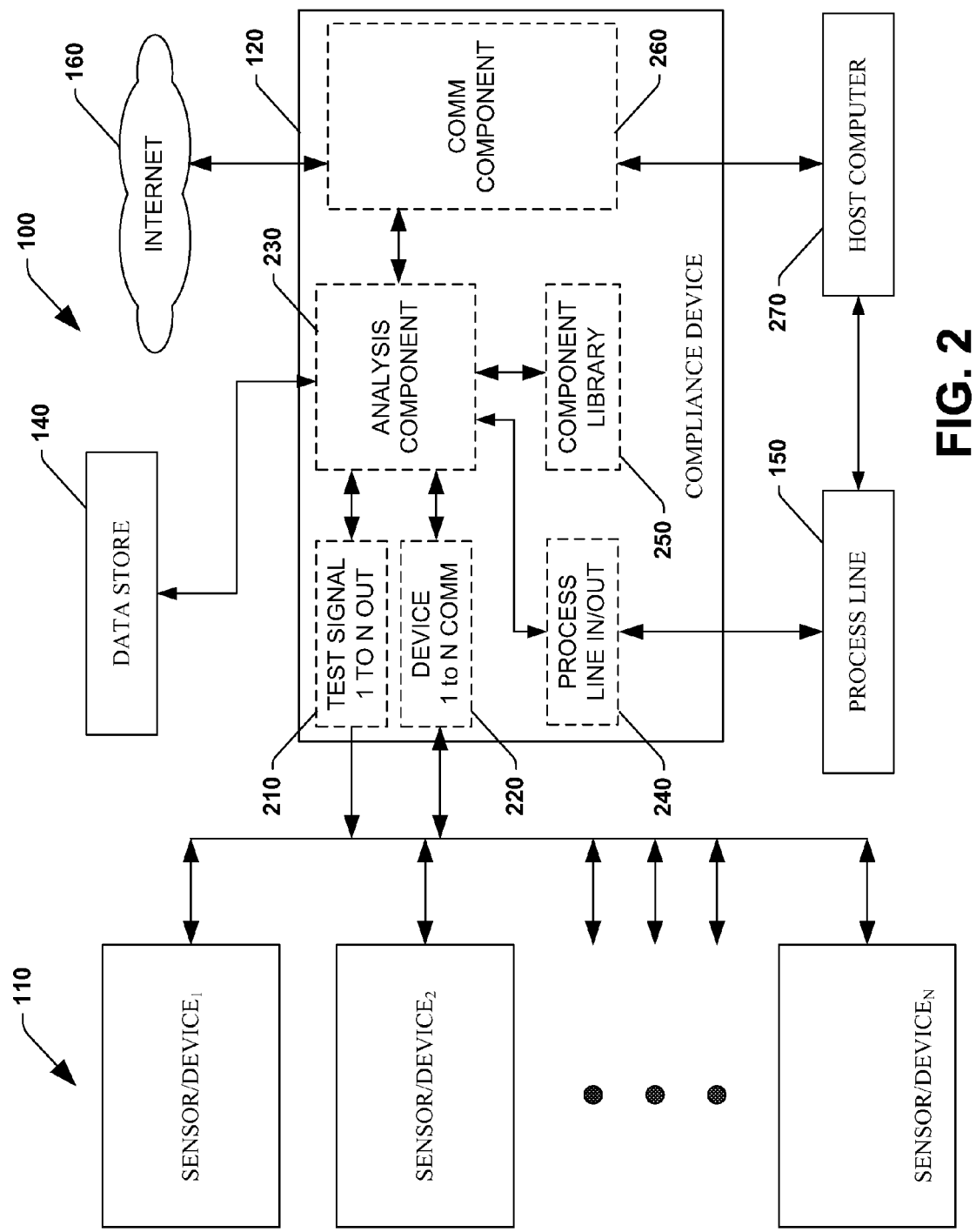
FIG. 2 is an illustration of exemplary components for a system in accordance with the subject invention.

FIG. 2 is an illustration of exemplary components for a system in accordance with the subject invention. The compliance device 120 may access a means of communicating a test signal 210 to the plurality of sensors or devices 110. The test signal may be, for example, a waveform that will elicit a known or unknown response from a sensor or device receiving the test signal. Moreover, the test signal could be, as additional examples, a digital outbound handshake signal, an optical signal, a wireless signal, an RF signal, or a combination thereof, among others. The test signal may be a broadcast signal to all sensors and devices, a sub-group of sensors or devices, or addressed to a single intended device. A broadcast signal or other signal generalized to communicate with multiple devices is transmitted to a plurality of sensors or devices 110 that contains only a lesser populated pool of sensors or even a single sensor or device is considered within the scope of the current invention. The means for communicating a test signal 210 may be a separate component within the compliance component 120, may be an external and separate component (not illustrated) to the compliance component 120, or may be a feature of another component (not illustrated) internal or external to the compliance device 120 such as the communication component 260, among others.

Communication data formats may be for example, simple or rich data streams or handshakes among others. For example, where a contact switch may only be able to indicate actual sensory data (e.g., the on-off signal), a light curtain may be a sensor device that can communicate rich data such as proximity, interruptions, operating state, counts, temperature, vibration, speed, etc. Where sensors or devices are built to an industrial or manufacturer data standard, signals sent from or returned from the devices, in addition to sending a signal that may be analyzed for compliance, may be able to communicate additional information such as device model identification, device parameters, device serial numbers or other identification information, device usage to date or archival usage data, device fault history, device condition, device diagnostic data, sensory or other device data, and combinations thereof, among others. While a control system may be able to extrapolate proper operation and conformance of the contact switch from the most basic signal output, it should be understood that a control system user may determine compliance and manually input compliance data. Further, analysis of multiple sources of data may be used for determination of sensor or device compliance and function (e.g., the contact switch on-off signal may be correlated with the light curtain signal, expected work piece throughput, worker inputs, or modeled behavior for the contact switch in the particular application, and combinations thereof, among others.)

The compliance component 120 may also access a means for communicating with a sensor or device 220. The means for communicating with a sensor or device 220 may be a separate component within the compliance component 120, may be an external and separate component (not illustrated) to the compliance component 120, or may be a feature of another component (not illustrated) internal or external to the compliance device 120 such as the communication component 260, among others. The means for communicating with a sensor or device 220 may employ waveforms, digital handshakes, optical signals, wireless signals, RF signals, or other equivalent means of communicating data between a sensor or device and the compliance device 120. The device communication may be invited by a broadcast signal to all sensors and devices, a sub-group of sensors or devices, or addressed to a single intended device. Further, the device communication may be a passive or active listening device for incoming data or communications from sensors or devices and may receive unsolicited communications from sensors or devices.

A compliance device 120 may also access an internal or external component library 250 for identifying compliance handshakes from sensors or devices in communication with the compliance device 120. This component library may also contain additional algorithms for decoding and/or processing and analyzing sensor or device communications by the analysis component 230 of a compliance device 120.

Further, a compliance device may access a communications component 260 for communication over the internet 160 or by wired or wireless networks or direct connections to a host computer 270. Access to the internet 160 may allow remote operation, programming, updating, data monitoring, signaling, data streaming, or other actions of the compliance device 120 to or from a remote location. Use of a host computer 270 may allow similar functionality.

For example, a rich data light curtain sensor may become damaged from exposure to normal vibration on the process line, the control system may monitor degraded performance in real time, request operation condition of the sensor, receive an unsolicited condition signal from the sensor, or predict that the sensor is degrading based on predictive modeling of the sensor, among others. The control system may then determine acceptable compliance for continued operation of the process line by analysis of data acquired by the system historically, based on manufacturer specifications stored in the control system or external to the system, specifications from the manufacturer access by use of the internet or by direct network or telephony connection to the manufacturer, use of analytics for similar devices, and manual user input, among others, and may communicate this analysis to a host computer or a remote work station.

The compliance component 120 may also access a means for communicating with process line(s) 240. The means for communicating with a process line(s) 240 may be a separate component within the compliance component 120, may be an external and separate component (not illustrated) to the compliance component 120, or may be a feature of another component (not illustrated) internal or external to the compliance device 120 such as the communication component 260, among others. Signals to the process line may be appropriate to increase, decrease, or stop the production line, among others.

For example, where the rich data light sensor in the above example is degrading and a determination is made that the sensor is not sufficiently functional to maintain full process line function, a further determination may be made by the control system to use redundant sensors, such as a contact switch sensor monitoring the same process in the process line, in conjunction with the degraded light curtain to maintain full operation. Even where the light curtain completely fails, the control system may continue full process line function through monitoring of the redundant contact switch sensor. In addition, the control system may determine that the process line may be run at less than full capacity to either meet business goals or to allow continued operation of the process line within the remaining functionality of a degraded sensor. Moreover, where a sensor has catastrophically failed and no redundant sensors are available for continued operation, or a sensor has degraded such that decreased performance of the line in continuing operation is sufficiently inefficient, or the nonconformance of a sensor(s) or device(s) creates a hazardous condition, the control system may deactivate the affected process line for maintenance, cause other process lines to increase in productivity to account for the deactivated line, notify appropriate entities of the decreased performance of the affected process line or overall process capability, or combinations thereof, among others.

An analysis component 230 may for example execute instructions for signaling sensors or devices 210 and with process lines 240, analysis of sensor or device communications 220 for compliance or data logging and optimization methods and prognostics, access to component libraries 250 and data stores 140 internally, externally, or hosted on a computer 270 or located on the internet 160 or at a remote location, communication over the internet 160 or with a host computer 270, or some combination thereof, among others. Other features may be incorporated in to the analysis component 230 to, for example, increase functionality or to accommodate changes to connections, communications networks, or connections to data sources such as accounting information systems components, maintenance scheduling components, business goals components, order tracking and productivity components, or combinations thereof among others.

Additionally in the example, notices may be sent to a maintenance department for example, indicating that a replacement or repair of the light curtain should be scheduled and indicating an optimum window for replacement of the sensor. The control system may function to implement a repair schedule across a plurality of process lines and numerous sensors independent of human interaction, (e.g., computer controlled scheduling for an entire process line, manufacturing facility, national operations for a company, or global corporate operations across single or multiple processes and process lines, among others.) Additionally, the control system may track part inventory, suggest ordering replacements or upgrades, or directly order replacement or upgrade parts, for example, to ensure that parts are available to complete maintenance requests.

The invention may also predict sensor or device failure, for example, where the process line continues running while replacement of the light curtain has been scheduled, the control system may based on historical data, predictive modeling, or real time monitoring, among others, determine that the contact switch sensor may be nearing failure. Further, the control system may determine the type of failure expected (e.g., that contact switch sensors fail catastrophically rather than degrading). Where the expected contact switch failure is predicted near the replacement or repair of the light curtain, the control system may determine that repair of the contact switch should occur contemporaneously, rather than allowing the contact switch to reach failure. Alternatively, where the contact switch sensor is redundant, the control system may schedule the repair at a future expected shut down of the process line independent of the repair or replacement of the light curtain.

Moreover, where a business goal has been analyzed by the control system, the control system may make determinations to help achieve those goals in an efficient manner. For example, where a special large production run with minimal room for error has been accepted, the control system may determine that the cost of a process line being down is less efficient that expending additional cost to replace, repair, or upgrade aged, degraded, or predicatively determined failures of sensors or devices for example, and may order and schedule service to attempt to meet the prescribed business goal through preemptive maintenance. Further, where multiple process lines may be required to meet the special production run, the control system may analytically determine and schedule maintenance on a portion of a line, portions of multiple lines, entire lines, all lines, or combinations thereof. In addition, where different process lines may become interdependent to meet a business goal, the control system may interact with the differing processes to determine how best to achieve the business goal with optimum efficiency.

The system may obtain such information from a host computer and/or other information systems, scheduling systems, inventory systems, order entry systems, decision support systems, maintenance scheduling systems, accounting systems or control systems among others within a larger process via a network or wireless communications. Moreover, this information may be obtained via a wide area network or global communications network, such as the Internet. In this regard, the optimization of one or more performance characteristics may be optimized on a global, enterprise-wide or process-wide basis. The invention thus allows a system operator to optimize process efficiency in light of overarching business goals. Predicted operating states of the machine may be determined based on expected demand or workload or a probabalistic estimate of future workload or demand. Undesirable future states of the system may be avoided or deferred through a suitable change in the control while achieving required operating objectives and optimizing established operational and business objectives.

Data acquired can also be used to model environmental operating conditions for a sensor or device such that the expected environment (e.g. temperature, pressure, vibration, . . . ) information and possible expected damage information may be considered in establishing the predicted future state of the system. These models may be refined by comparison to real time data collection, historical comparison to failed sensor or device components, and predictive models provided by sensor or device manufacturers. This information may be further analyzed against business operations goals, cost files, predicted future sensor or device costs, costs of installation and maintenance, costs and performance of alternate sensors or devices from the same or different manufacturers, etc., to improve sensor or device selection to meet the business objectives of the entity.

It will be appreciated by one skilled in the art that such sensor systems are scalable to provide control systems and methods for self sensing, communicating with, monitoring of, controlling and optimizing utilization of, networked industrial sensors and related control systems primarily in an industrial automation environment, from the most simple single operation sensor to vastly more complex systems monitoring sensors across multiple production lines in a single company, multiple production lines across multiple companies or operation locations, and even global operations across multiple continents and independent companies each operating a multitude of process lines.

Figure 3:
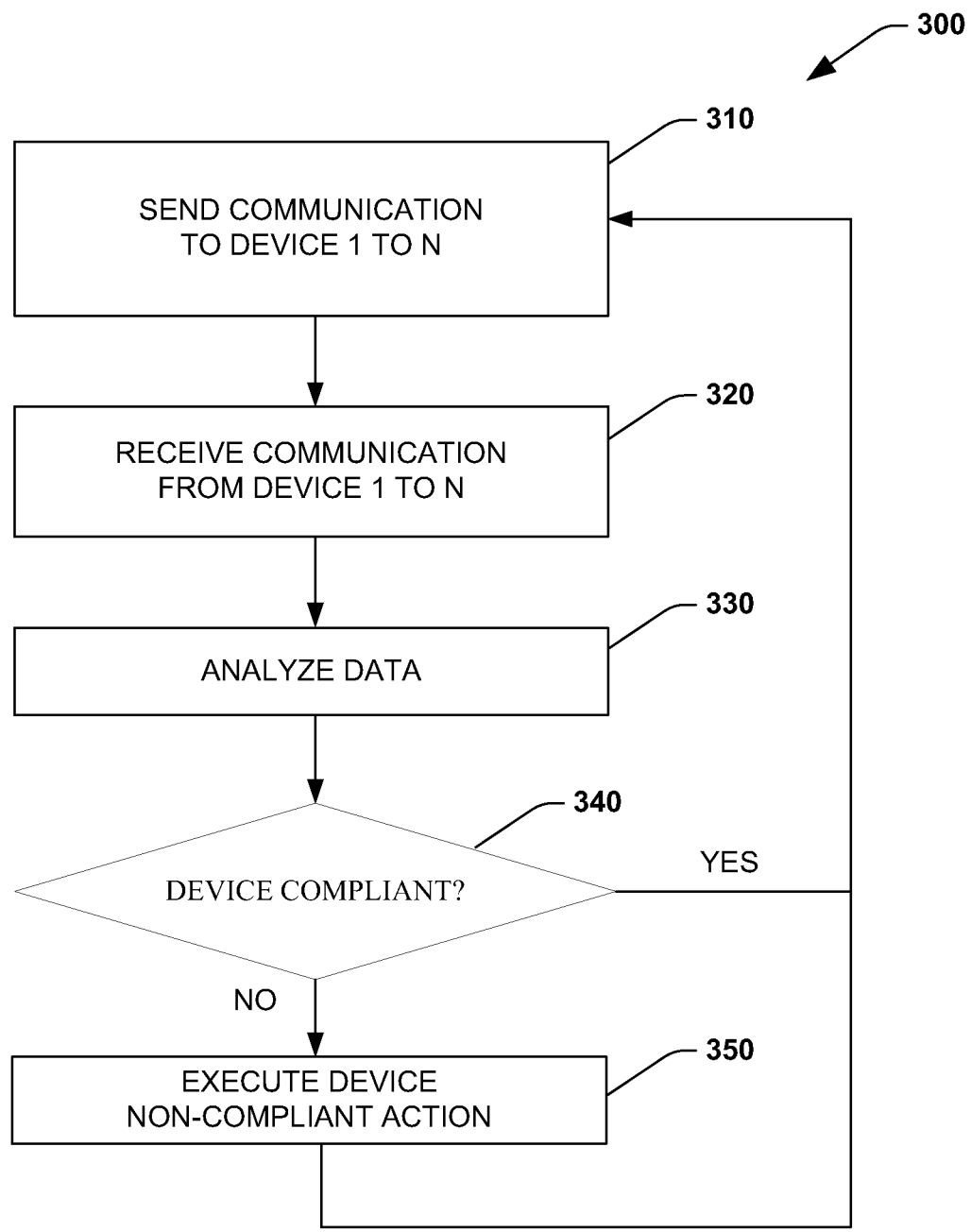
FIG. 3 is a high-level flow diagram in accordance with one particular aspect of the subject invention.

FIG. 3 is a high-level flow diagram in accordance with one particular aspect of the subject invention. Where the compliance device enters the methodology 300 for communicating with a plurality of sensors or devices 110 at active polling block 310 of the plurality of sensors or devices 110 (either as a broadcast poll or addressed to a single sensor or device) the methodology 300 proceeds to block 320 where sensor or device communication is received from the plurality of sensors or devices 110. The methodology may also be entered at block 320 where the compliance component 120 is set to either passively or actively listen for sensor or device communications. The data or signals communicated to the compliance component 120 in block 320 are then analyzed in block 330.

The data analysis in block 330 is always checked for device compliance in decision block 340. Compliant devices may reenter the methodology 300 while non-compliant devices trigger additional actions, for example, safe-stopping a process line, checking for redundant sensors or devices to provide process line data and scheduling maintenance, etc. However, additional steps (not illustrated) may be performed with the analyzed data depending on the content of the data analyzed in block 330. Data analyzed may include real time data received from the sensor or device communication containing, for example, a device identification, a returned signal from the device polling step of 310, diagnostic or prognostic information stored on an advanced sensor or device and communicated in block 320, but may also include data relating to sensor or device diagnostics or prognostics collected from a historical database 140, collected in situ, for example, from operation of an order tracking component collected over a network connection such as the internet 160, data collected from other networked sensors or devices, data generated by analyzing the aforementioned collected data in a current or prior iteration, or combinations thereof among others (not illustrated for ease of understanding.) Data relating to various business concerns (e.g., inventory, revenue, marketing, accounting, utilities, cash flow, mission statements, manufacturing, logistics, asset management, layout, processes, etc.) may be received and/or generated. Such data can be gathered for example from various business software packages, manually, spreadsheets, etc. Moreover, some of the data may be generated via employment of artificial intelligence systems (e.g., neural networks, belief networks, fuzzy logic systems, expert systems, data fusion engines, combination thereof).

Wherein the compliance component may access, store, and analyze data from a plurality of data components, either locally or remotely, the data analysis may trigger other functions such as data logging, process line safety stops, process line productivity adjustments, scheduling maintenance of sensors or devices, or suggesting replacements or upgrades, among others. The invention may provide the measured attribute(s) to a neural network, an expert system, a fuzzy logic system, and/or a data fusion component, or a combination of these, which generates the diagnostics signal indicative of the health of the sensor or device system. Further, the prognostic analysis of this data can serve to preemptively maintain or upgrade sensor or device components based on MTBF, degraded sensor or device signals, diagnostics or prognostics received from advanced sensors or devices, prognostic devices based on real time acquired data for historical failures of sensors or devices, etc. Applying this advanced data analysis in the sensor or device control system through various business concern components and systems may optimize process line "uptime", increase employee health, and improve control system performance over time. It is to be appreciated that the subject invention employs highly sophisticated diagnostic and prognostic data gathering, generation and analysis techniques, and such should not be confused with trivial techniques such as automatic disconnect based on an excessively high current or temperature to be integrated diagnostics (e.g., something is wrong) and control (e.g., automatic contact closure).

PROGNOSTICS & CONTROL: Although process optimization has been employed for many years (e.g. dynamic optimization) such as for continuous chemical processing applications, unique and important benefits are possible by utilizing sensor or device diagnostics and prognostic information to prescribe an optimum control action dynamically. The benefits of integrated diagnostics and control may be significantly expanded by utilizing information describing the rate of degradation and remaining useful life of sensors or devices under various possible operating conditions. This permits just-in-time maintenance of sensors, which under a catastrophic sensor or device failure could shut down a production line resulting in massive losses to an entity, by minimizing maintenance costs and downtime thereby improving revenue generation. Prognostics with control provides the foundation for overall process optimization with regard to objectives such as efficiency, business strategies, maintenance costs, or financial performance.

The subject invention's focus of prognostics and distributed control will enable future plant operations to be based on proactive operation rather than reactive problem solving. Device alerts from remote intelligent sensors or devices can warn of future potential problems giving time for appropriate remedial or preventive action. Embedding operational objectives and plant performance metrics into an automated decision-making system can permit a high of degree sensor or device reliability to avoid the unexpected process failures that impact quality and reduce yields. Integrating prognostic information with automatic, real-time decision making provides a basis for dynamic optimization and provides unique, important benefits due to optimized plant operation.

ASSET OPTIMIZATION: The specification of the optimum operation of plant equipment described above provides a flexible platform to incorporate various business and operational factors. It is possible to include the cost of maintenance for various failure modes, replacement and installation costs, maintenance strategies, cost for scrap, re-work, line-restarting, and revenue generation from the specified machinery in a process line. This permits the generation and implementation of optimal asset lifetime management policies across critical plant assets. The operational success of this approach requires an effective Asset Register base, observability of key state variables, and viable process and component models. The utilization of open, industry standards for asset registry provides important capabilities for integrating operating information across a manufacturing plant and even across facilities. More recent developments have resulted in an Open Systems Architecture for Condition-Based Maintenance that provides a framework for real-time integration of machinery health and prognostic information with decision support activities. This framework spans the range from sensors input to decision support—it is open to the public and may be implemented in a DCOM, CORBA, or HTTP/XML environment.

REAL OPTIONS ANALYSIS AS AN ECONOMIC TOOL: In connection with sensor or device and business state prognostics, asset management and optimization in accordance with the subject invention, it is to be appreciated that preventing unexpected equipment failures can provide important operational and economic benefits. Using real options pricing to provide a more accurate value of deferring sensor or device repair or suggesting more efficient or cost effective sensors or devices may provide additional revenue to an entity. One aspect of the subject invention provides for automatically on a period basis checking the availability, cost, and performance specifications of new sensors or devices to replace healthy sensors or devices. Swapping out old, less efficient sensors or devices with new, more efficient sensors or devices permits further optimizing process operation and optimizing overall asset utilization.

The asset optimization program in connection with the subject invention for example could launch a crawler or spider to search for potential replacement sensors or devices across the Internet. The asset optimization system can for example continually monitor new models of sensors or devices compatible with a process line to maximize revenue generation. If sensor or device costs become low enough then the criteria for replacing operational sensors or devices with improved sensors or devices will overtake the optimization criteria of maximizing production throughput by keeping a process line running with the older less efficient (e.g., less reliable, higher cost to replace, less accurate data acquisition or sensing, etc.) sensors or devices.

The aforementioned examples and discussion are simply to convey the numerous advantages associated with the subject invention. It is to be appreciated that any suitable number of components and combination thereof can be employed in connection with optimizing the overall system 100 in accordance with the present invention. Moreover, as a result of the large number of combinations of components available in connection with the subject invention, some of the combinations will have known correlations while there may exists other correlations not readily apparent but yet still have an influence in connection with optimization of the system 100. Accordingly, in connection with one particular aspect of the invention data fusion can be employed in situations in order to take advantage of information fission which may be inherent to a process relating to sensing a physical environment through several different sensor modalities. In particular, one or more available sensing elements may provide a unique window into the physical environment where the phenomena to be observed is occurring (e.g., vibration in a process line may be causing unusual signal from sensor or device or a cluster of sensors or devices). Because the complete details of the phenomena being studied may not be contained within a single sensing element window, there is information fragmentation which results from this fission process. These information fragments associated with the various sensing devices may include both independent and dependent components.

The independent components may be used to further fill out (or span) the information space and the dependent components may be employed in combination to improve the quality of common information recognizing that all sensor data may be subject to error and/or noise. In this context, data fusion techniques employed in an ERP system may include algorithmic processing of sensor data in order to compensate for the inherent fragmentation of information because a particular phenomenon may not be observed directly using a single sensing element. Thus, data fusion provides a suitable framework to facilitate condensing, combining, evaluating and interpreting the available sensed information in the context of the particular application. It will further be appreciated that the data fusion may be employed in the diagnostics and prognostic component in order to employ available sensors to infer or derive attribute information not directly measurable, or in the event of sensor failure.

Thus, the present invention provides a data fusion framework and algorithms to facilitate condensing, combining, evaluating and interpreting various sensed data. The present invention also facilitates establishing a health state of a system, as well as for predicting or anticipating a future state of the plurality of sensors or devices 110 and/or the system 100. The data fusion system may be employed to derive system attribute information relating to any number of attributes according to measured attribute information (e.g., from the sensors) in accordance with the present invention. In this regard, the available attribute information may be employed by the data fusion system to derive attributes related to failed sensors, and/or to other performance characteristics of the plurality of sensors and devices 110 and/or system 100 for which sensors are not available. Such attribute information derived via the data fusion may be employed in generating a diagnostics signal or data, and/or in performing control functions in connection therewith.

Figure 4:
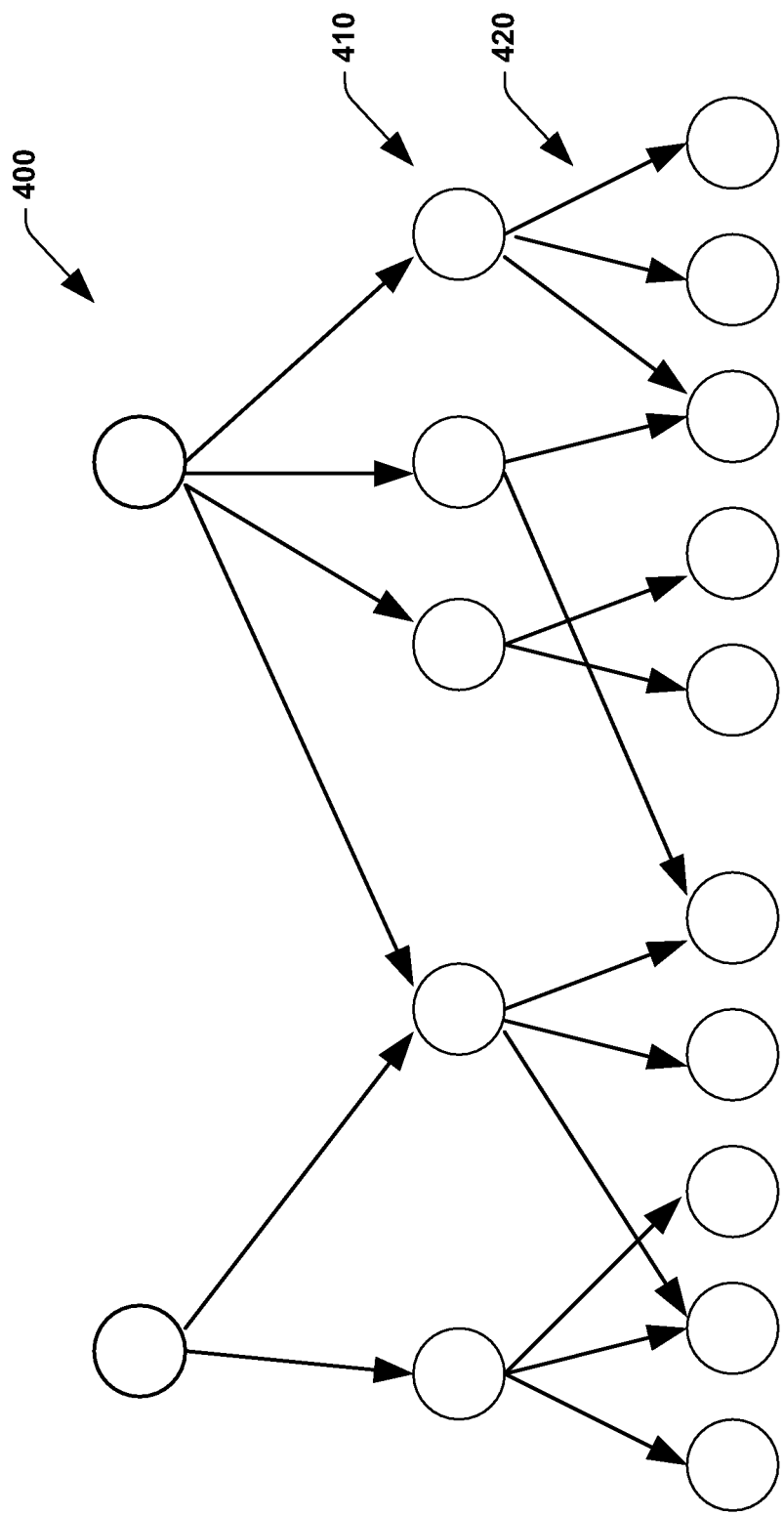
FIG. 4 illustrates an exemplary belief network in accordance with the subject invention.

FIG. 4 illustrates an exemplary belief network 400 that can be are used to model uncertainty in a domain in connection with the subject invention. The term "belief networks" as employed herein is intended to encompass a whole range of different but related techniques which deal with reasoning under uncertainty. Both quantitative (mainly using Bayesian probabilistic methods) and qualitative techniques are used. Influence diagrams are an extension to belief networks; they are used when working with decision making. Belief networks are employed to develop knowledge based applications in domains which are characterized by inherent uncertainty. A problem domain is modeled as a set of nodes 410 interconnected with arcs 420 to form a directed acyclic graph as shown in FIG. 4. Each node represents a random variable, or uncertain quantity, which can take two or more possible values. The arcs 420 signify the existence of direct influences between the linked variables, and the strength of each influence is quantified by a forward conditional probability.

Within the belief network the belief of each node (the node's conditional probability) is calculated based on observed evidence. Various methods have been developed for evaluating node beliefs and for performing probabilistic inference. The various schemes are essentially the same—they provide a mechanism to propagate uncertainty in the belief network, and a formalism to combine evidence to determine the belief in a node. Influence diagrams, which are an extension of belief networks, provide facilities for structuring the goals of the diagnosis and for ascertaining the value (the influence) that given information will have when determining a diagnosis. In influence diagrams, there are three types of node: chance nodes, which correspond to the nodes in Bayesian belief networks; utility nodes, which represent the utilities of decisions; and decision nodes, which represent decisions which can be taken to influence the state of the world. Influence diagrams are useful in real world applications where there is often a cost, both in terms of time and money, in obtaining information.

An expectation maximization (EM) algorithm is a common approach for learning in belief networks. In its standard form it does not calculate the full posterior probability distribution of the parameters, but rather focuses in on maximum a posteriori parameter values. The EM algorithm works by taking an iterative approach to inference learning. In the first step, called the E step, the EM algorithm performs inference in the belief network for each of the datum in the dataset. This allows the information from the data to be used, and various necessary statistics S to be calculated from the resulting posterior probabilities. Then in the M step, parameters are chosen to maximize the log posterior log $P(T|D,S)$ given these statistics are fixed. The result is a new set of parameters, with the statistics S which we collected are no longer accurate. Hence the E step must be repeated, then the M step and so on. At each stage the EM algorithm guarantees that the posterior probability must increase. Hence it eventually converges to a local maximum of the log posterior.

Figure 5:
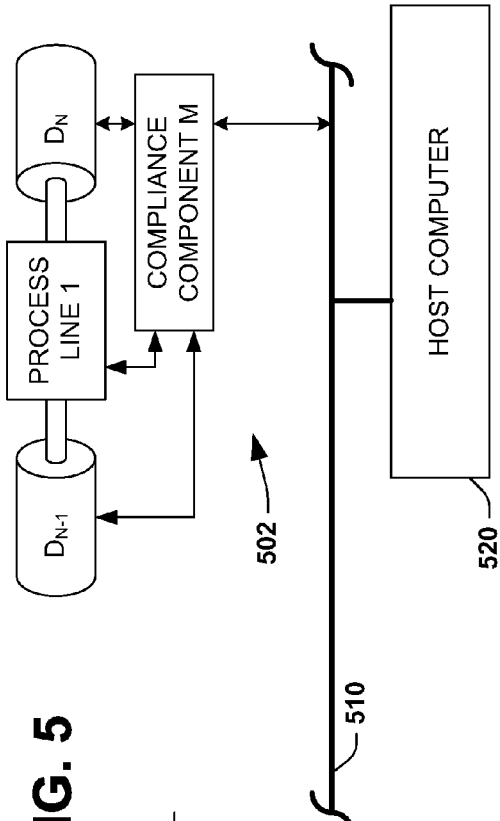
FIG. 5 is a schematic diagram illustrating an exemplary distributed sensor system having a host computer as well as multiple sensors or devices in conjunction with a single process line and multiple compliance components networked for peer-to-peer and/or host-to-peer communication according to an aspect of the invention.

FIG. 5 is a schematic diagram illustrating an exemplary distributed sensor system having a host computer as well as multiple sensors or devices in conjunction with a single process line and multiple compliance components networked for peer-to-peer and/or host-to-peer communication according to an aspect of the invention. The optimization aspects of the invention may be employed across a plurality of compliance components 120 controlling various sensors and devices along a single process line. Separate compliance components 1(500) through M (502) (where M is and integer) may be networked 510 to a host computer 520. Such sub-systems 500 and 502 may comprise individual sensors or devices 500 or multiple sensors and devices 502. As illustrated in FIG. 5, an integer number N of such individual sensors or devices can be coupled to compliance components 1 through M allowing peer-to-peer communication therebetween.

The compliance components 1 through M may exchange information relating to process conditions (e.g., sensor or device readings), control information (e.g., sensor or device compliance), and performance characteristic information (e.g., related to life cycle cost information, efficiency information, life expectancy information, safety information, emissions information, operational cost information, MTBF information, noise information, vibration information, production requirements, delivery schedules, and the like). One or more of the individual compliance components may determine desired operating points for the associated sub-systems according to performance characteristic information obtained from other controllers via the network 510, and/or from sensors associated with the individual sub-systems. A host computer 520 may provide centralized operation of the sub-systems. Other information may be exchanged between the computer 520 and the various networked compliance components in host-to-peer fashion, such as information relating to process conditions, control information, and performance characteristic information, whereby an efficiency optimization component in the host computer 520 may be determined and communicated to the compliance components associated with the system.

Figure 6:
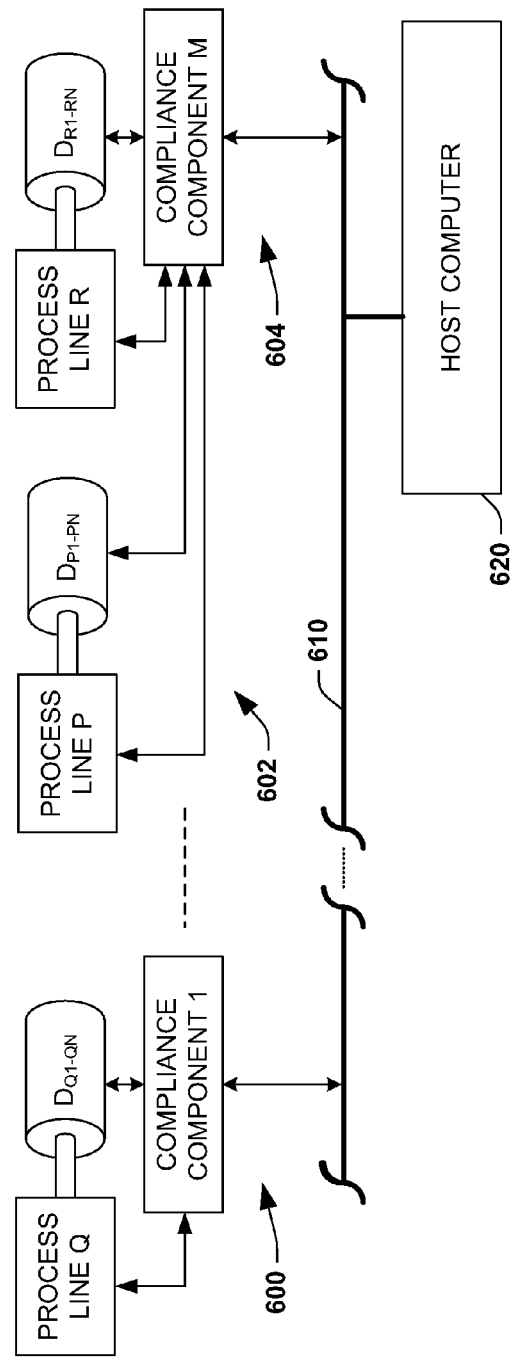
FIG. 6 is a schematic diagram illustrating another exemplary distributed sensor system having a host computer as well as multiple sensors or devices in conjunction with multiple process lines and multiple compliance components networked for peer-to-peer and/or host-to-peer communication according to an aspect of the invention.

FIG. 6 is a schematic diagram illustrating another exemplary distributed sensor system having a host computer as well as multiple sensors or devices in conjunction with a multiple process lines and multiple compliance components networked for peer-to-peer and/or host-to-peer communication according to an aspect of the invention. The optimization aspects of the invention may be employed across a plurality of compliance components 120 controlling various sensors and devices along multiple process lines. Separate compliance components 1(600) through M (604) (where M is and integer) may be networked 610 to a host computer 620. Sub-systems 600, 602, and 604 may comprise individual sensors or devices or multiple sensors and devices across multiple process lines Q 600, P 602, and R 604. As illustrated in FIG. 6, a plurality of process lines sensors or devices coupled to compliance components may be networked allowing peer-to-peer communication therebetween. A host computer 620 may provide centralized operation of the sub-systems. Other information may be exchanged between the computer 620 and the various networked compliance components in host-to-peer fashion, such as information relating to process conditions, control information, and performance characteristic information, whereby an efficiency optimization component in the host computer 620 may be determined and communicated to the compliance components associated with the system.

Figure 7:
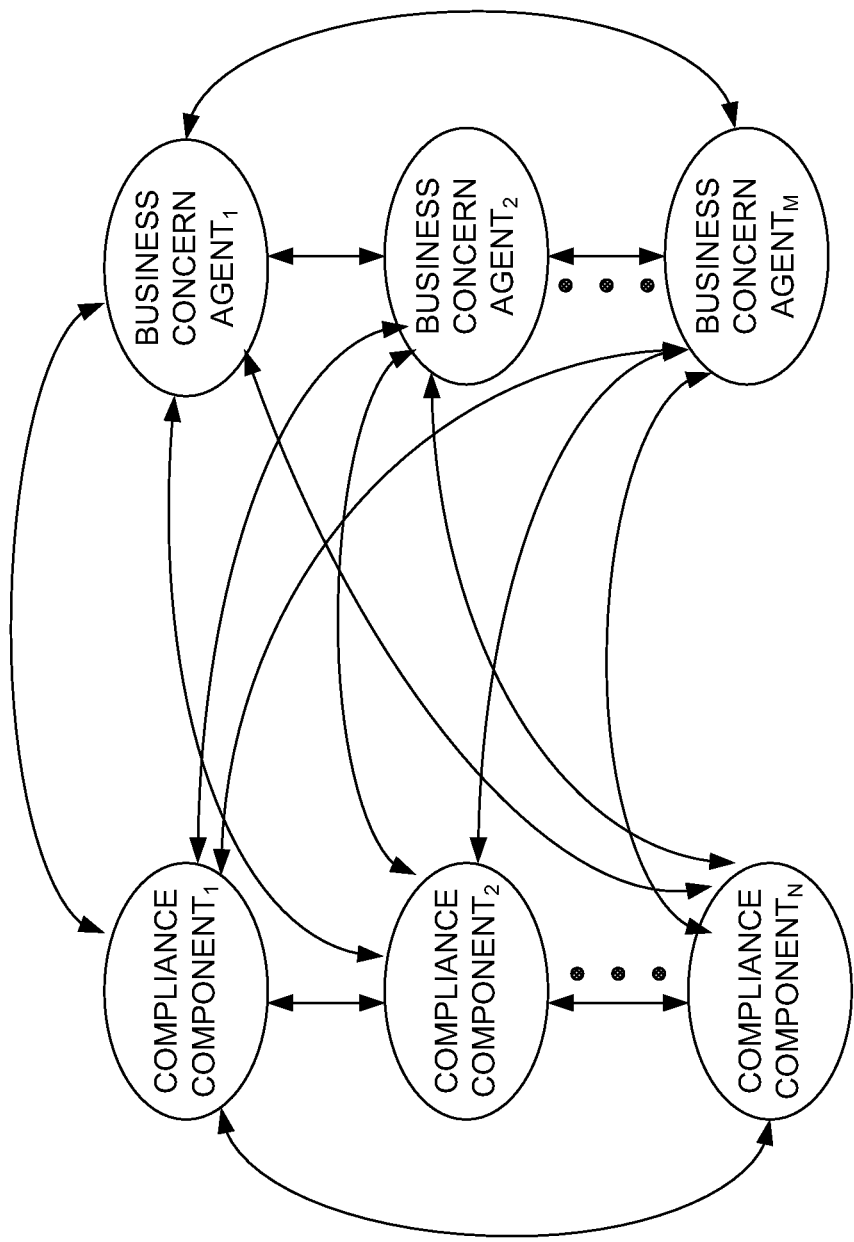
FIG. 7 illustrates an exemplary intelligent agent-based framework in accordance with the subject invention.

FIG. 7 illustrates an exemplary intelligent agent-based framework in accordance with the subject invention wherein least a subset of the compliance components are represented via intelligent software agents. For example, each of the respective compliance components 110 (FIG. 1) can be represented by respective intelligent agents (COMPLIANCE COMPONENT 1 through COMPLIANCE COMPONENT N—N being an integer), and various business concerns represented by respective agents (e.g., BUSINESS CONCERN 1 through BUSINESS CONCERN M —M being an integer). The intelligent agents can be software models representative of their various physical or software counterparts, and these agents can serve as proxies for their counterparts and facilitate execution of various aspects (e.g., compliance component interaction, modification, optimization, . . . ) of the subject invention. The agents can be designed (e.g., appropriate hooks, interfaces, common platform, schema, translators, converters . . . ) so as to facilitate easy interaction with other agents. Accordingly, rather than executing an optimization algorithm for example on a respective compliance component directly, such algorithms can be first executed on the respective agents and then once the system 100 decides on an appropriate set of modifications the final modifications are implemented at the agent counterparts with the agents carrying the instructions for such modifications.

The proliferation of distributed computing systems and enhanced prognostic, control, and optimization techniques provides through the subject invention for changing the landscape of industrial automation systems. The aforementioned framework complements technical capabilities for asset optimization via an agent based representation. Agents may be considered autonomous, intelligent devices with local objectives and local decision making. These agents however can be part of a larger collection of agents and possess social and collaborative decision making as well. These capabilities permit localized or distributed agents to collaborate and meet new, possibly unforeseen operational conditions. In addition, through collaboration, some agents may choose to operate in a sub-optimal mode in order to achieve some higher level objective such as asset optimization, process safety, or overall process energy optimization.

Figure 8:
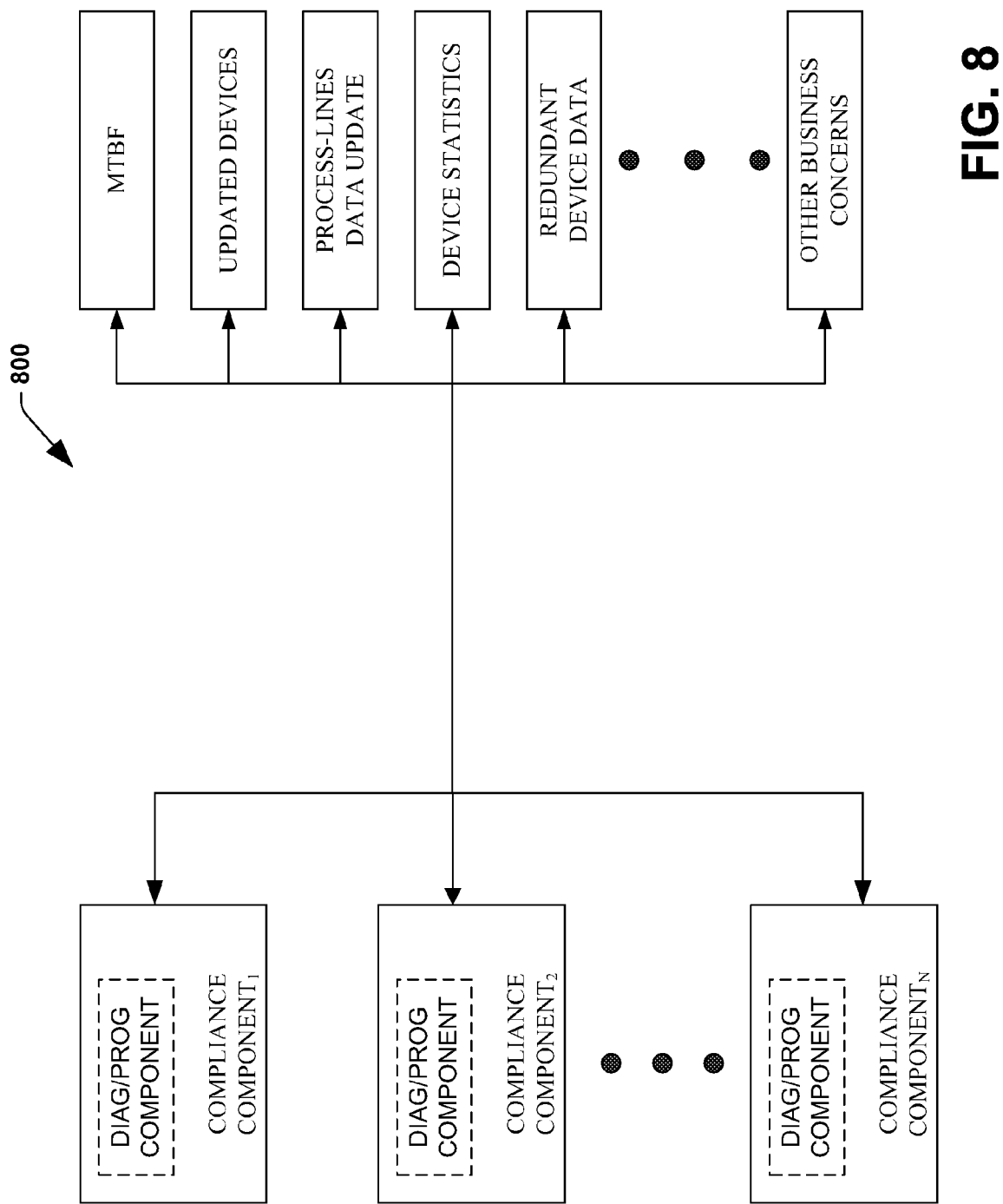
FIG. 8 is a high level illustration of a distributed system in accordance with the subject invention.

FIG. 8 is a high level illustration of a distributed system in accordance with the subject invention. The invention is employed as part of a distributed system 800 rather than via a host computer (FIG. 2). Thus, the various components in the system 800 share processing resources and work in unison and/or in subsets to optimize the overall system 800 in accordance with various business objectives. It is to be appreciated that such distributed system can employ intelligent agents as described above as well as belief networks (FIG. 4) and the ERP components and data fusion described above in connection with the system 100. Rather than some of these components (ERP, data fusion) being resident on a single dedicated machine or group of machines, they can be distributed among any suitable components within the system 800. Moreover, depending on which threads on being executed by particular processors and the priority thereof, the components may be executed by a most appropriate processor or set of processors given the state of all respective processors within the system 800.

Figure 9:
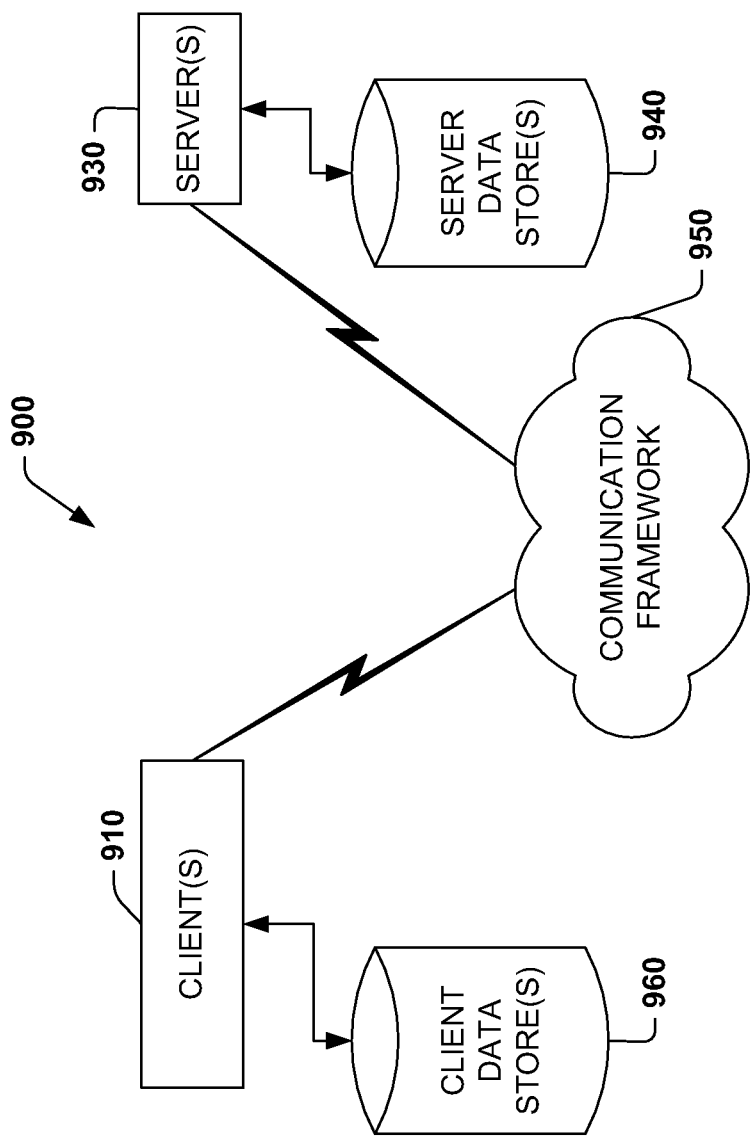
FIGS. 9 and 10 illustrate exemplary computing devices in accordance with embodiments described herein.
Figure 10:
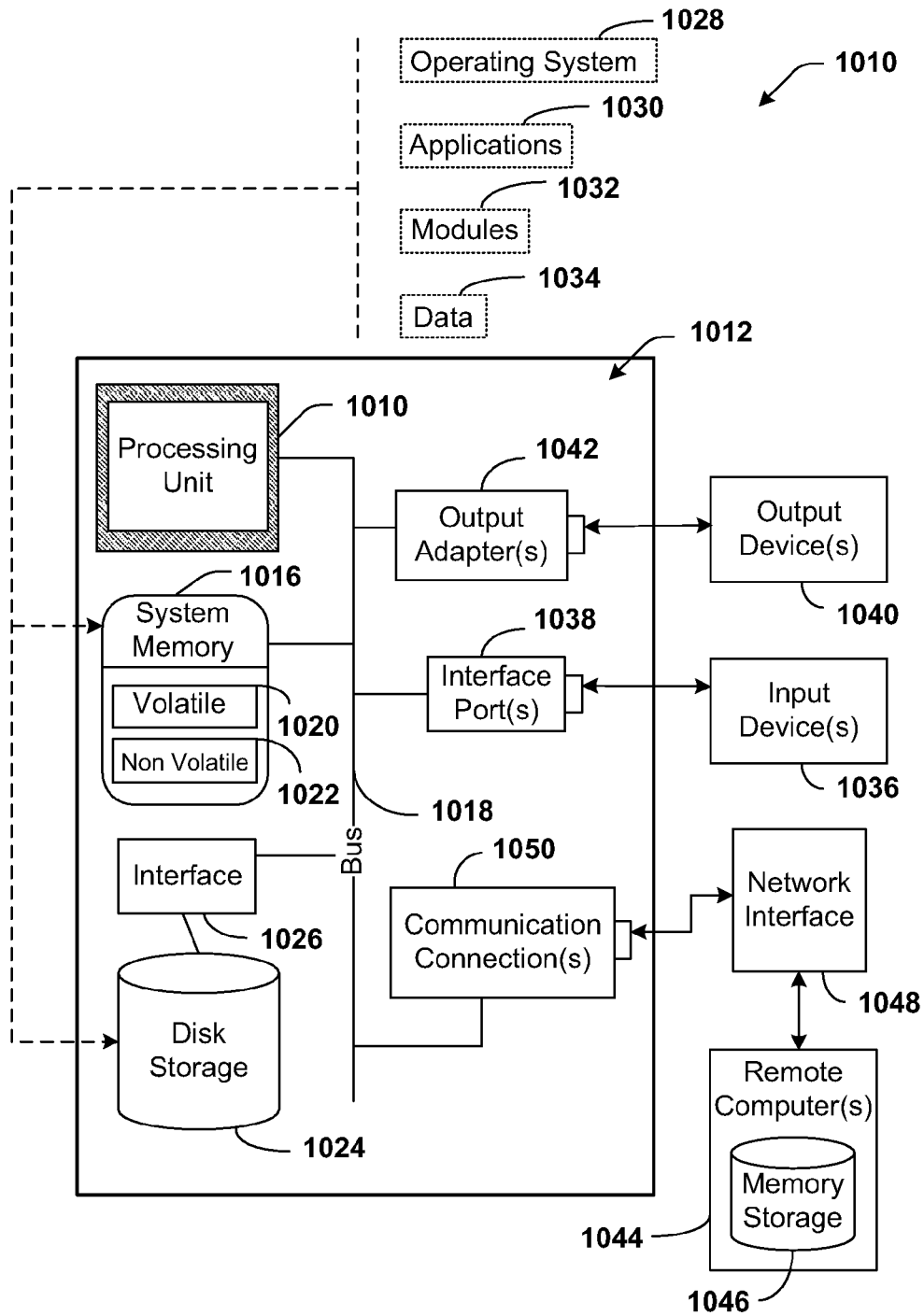

In order to provide additional context for implementation, FIGS. 9 and 10 and the following discussion is intended to provide a brief, general description of a suitable computing environment within which disclosed and described components and methods can be implemented. While various specific implementations have been described above in the general context of computer-executable instructions of a computer program that runs on a local computer and/or remote computer, those skilled in the art will recognize that other implementations are also possible either alone or in combination with other program modules. Generally, program modules include routines, programs, components, data structures, etc., that perform particular tasks and/or implement particular abstract data types.

Moreover, those skilled in the art will appreciate that the above-described components and methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. Certain illustrated aspects of the disclosed and described components and methods may also be practiced in distributed computing environments where certain tasks are performed by remote processing devices that are linked through a communications network or other data connection. However, some, if not all, of these aspects may be practiced on stand-alone computers. In a distributed computing environment, program modules may be located in local and/or remote memory storage devices.

FIG. 9 is a schematic block diagram of a sample-computing environment 900 with which the subject invention can interact. The system 900 includes one or more client(s) 910. The client(s) 910 can be hardware and/or software (e.g., threads, processes, computing devices). The system 900 also includes one or more server(s) 930. The server(s) 930 can be hardware and/or software (e.g., threads, processes, computing devices). The servers 930 can house threads or processes to perform transformations by employing the subject invention, for example.

One possible means of communication between a client 910 and a server 930 can be in the form of a data packet adapted to be transmitted between two or more computer processes. The system 900 includes a communication framework 940 that can be employed to facilitate communications between the client(s) 910 and the server(s) 930. The client(s) 910 are operably connected to one or more client data store(s) 960 that can be employed to store information local to the client(s) 910. Similarly, the server(s) 930 are operably connected to one or more server data store(s) 940 that can be employed to store information local to the servers 930.

With reference to FIG. 10, an exemplary environment 1000 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. For example, FIG. 10 illustrates a disk storage 1024. The disk storage 1024 includes, but is not limited to, devices like a magnetic disk drive, floppy disk drive, tape drive, Jaz drive, Zip drive, LS drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. The operating system 1028, which can be stored on the disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. The input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1248 includes, for exemplary purposes only, internal and external technologies such as, modems including regular telephone grade modems, cable modems and DSL modems, ISDN adapters, and Ethernet cards.

Figure 11:
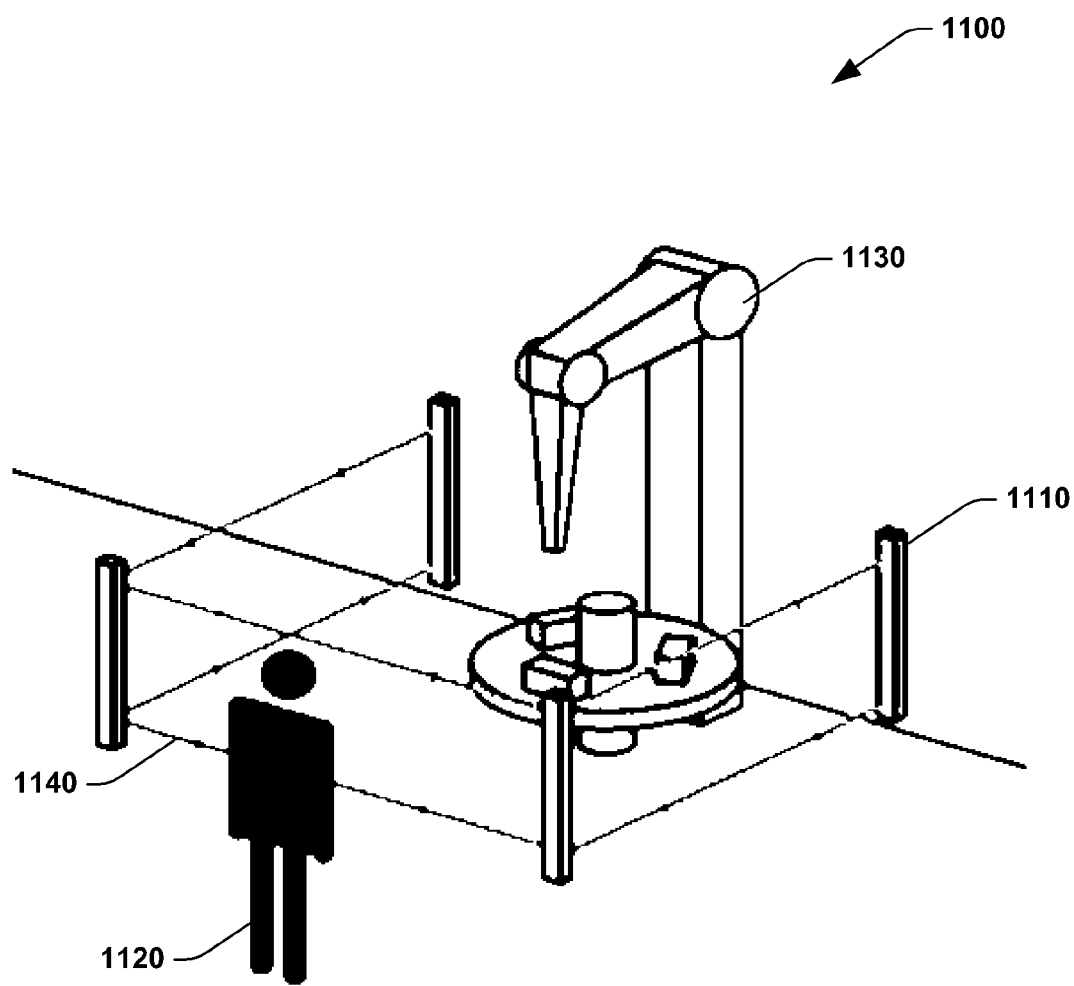
FIG. 11 illustrates an exemplary non-limiting application in accordance with the disclosed subject matter.

Turning to FIG. 11, illustrated is one particular non-limiting example of employing a self sensing component interface in accord with the disclosed subject matter. The example is presented only to better illustrate some aspects of the disclosed subject matter and is not presented to limit the innovation to this particular application. One of skill in the art will appreciate that many aspects addressed by the disclosed subject matter are not presented in this particular example and that all such aspects are still to be considered within the scope of the disclosed subject matter. System 1100 can facilitate, for example, a safer work environment by employing self-sensing components in, for example, a proximity sensing safety system 1110.

The proximity sensing system 1110 can be implemented to better protect workers 1120 operating near a machine 1130 that can cause injury to the worker 1120 were the worker 1120 to enter a zone of danger around machine 1130. This zone of danger can be, at least in part, defined by, for example, sensing beams 1140 related to the proximity sensing system 1110. Where a worker 1120 crosses the sensing beam 1140, and thus enters the zone of danger, the proximity sensing system can disable the machine 1130 to better protect the worker 1120 against possible injury.

Where these types of systems 1110 need to be robust to provide a degree of confidence that the systems 1110 will operate as designed to improve worker 1120 safety, these systems 1110 can benefit from self-sensing components in accordance with the disclosed subject matter. For example, where a sensing beam 1140 generating component is to be replaced in the system 1110 (e.g. due to aging of the sensing beam 1140 component to be replaced, improved sensing beam 1140 components becoming available to upgrade existing sensing beam 1140 components, regularly scheduled maintenance of sensing beam 1140 components, . . . ) placing the new sensing beam 1140 component can conventionally include, for example, non-automated or semi-automated determining of the types of contacts (e.g., dry contact, OSSD, . . . ), verifying the connections, verifying the compatibility of the new component with the existing system, updating parameters related to installing a new or different component, and combinations thereof, among many other checks and verifications. By employing sensors in accordance with the disclosed subject matter (e.g., system 1110 and 1000 are adapted to employ self-sensing components in accordance with the disclose subject matter), the new sensing beam 1140 component can, in an automated fashion, communicate with a compliance device (e.g., 120) to verify that the new sensing beam 1140 component is compliant with the proximity sensing system 1110.

Where the new sensing beam 1140 component can pass an electronic signature to a compliance device (e.g., 120) in the proximity sensing system 1110 (or located elsewhere as part of a distributed compliance system as herein disclosed) that can, for example, identify the new sensing beam 1140 component, verify that it is a compliant device, seek out and update any device drivers for the new sensing beam 1140 component, log environmental conditions for the new component, verify that the new sensing beam 1140 component is generating a satisfactory sensing beam 1140 and/or other signals that re usual and customary for the device installation, verify that the new sensing beam 1140 component is receiving all usual and customary signals related to the device installation, or combinations thereof, among numerous other features disclosed herein for a self-sensing component interface system.

Clearly, by employing devices that can, for example, self check for operability, self-check for compatibility, self-check for functionality, and/or self-update, among other advanced features provided by the disclosed subject matter, an improvement in both confidence in the proximity sensing system and improvements in installation efficiency and maintenance can be achieved, among other improvements.

This non-limiting example is provided only to better illustrate some aspects of the disclosed subject matter and is intended to be non-limiting as to the scope of the disclosed subject matter in all aspects. Additional benefits, such as but not limited to, future maintenance requests, future self checking for operability and functionality, self-requesting updates to component software and drivers, self-checking for alternate devices that can be more efficient or provide additional benefit to the user, data logging and generating inferences related to performance and operability, or combinations thereof, among numerous other advantages are not discussed with respect to this specific example but, as will be apparent to one of skill in the art, are not precluded from being applied in this specific example or any other example of the herein disclosed subject matter.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates self-sensing a device connected to a safety input in an industrial business operation, comprising:
    a compliance component configured to receive a signal from the device, wherein the signal relates to a test signal;
    a diagnostics and prognostics component configured to determine compliance of the device with the industrial business operation based on the signal;
    the compliance component is further configured to execute the industrial business operation at a reduced performance level in response to a determination by diagnostics and prognostics component that the device is not in compliance with the industrial business operation, wherein the device is not compliant due to degradation and the reduced performance level is selected to alter a predicted rate of degradation of the device to a rate that allows for the device to survive until a time at which the device can be replaced or repaired.

2. The system of claim 1, wherein the compliance component is further configured to generate the test signal to solicit generation of the signal received by the compliance component and the diagnostics and prognostics component configured to determine if the received signal indicates that the type of the device is a dry contact device or an output signal switching device, wherein the compliance component is further configured to set a flag corresponding to a determined type of the device.

3. The system of claim 2, wherein the test signal is a waveform signal.

4. The system of claim 2, wherein the diagnostics and prognostics component is further configured to:
    monitor the test signal at an output of the compliance component;
    compare the generated test signal to the received signal;
    wherein the received signal being sufficiently similar to the generated test signal indicates that the type of device is a dry contact device; and
    wherein the received signal not being sufficiently similar to the generated test signal, and wherein the generated test signal is sufficiently similar to the monitored test signal, and wherein the received signal is not a digital low signal indicates that the type of device is not a dry contact device.

5. The system of claim 4,
    wherein the received signal not being sufficiently similar to the generated test signal, and wherein the generated test signal is sufficiently similar to the monitored test signal, and wherein the received signal is a digital low signal indicates that the compliance component is open circuited.

6. The system of claim 4,
    wherein the received signal not being sufficiently similar to the generated test signal, and wherein the generated test signal is not sufficiently similar to the monitored test signal, and wherein the monitored test signal is a digital low signal, indicates that the compliance component is short circuited to a ground rail.

7. The system of claim 4,
    wherein the received signal not being sufficiently similar to the generated test signal, and wherein the generated test signal is not sufficiently similar to the monitored test signal, and wherein the monitored test signal is a digital high signal, indicates that the compliance component is short circuited to a power rail.

8. The system of claim 2, wherein the diagnostics and prognostics component is further configured to:
    monitor the test signal at an output of the compliance component;
    compare the test signal to the received signal;
    determine that the type of device is an output signal switching device based on the compare of the test signal to the received signal.

9. The system of claim 1, wherein the compliance device determines the predicted rate of degradation of the device by accessing a predictive model generated by a manufacturer of the device.

10. The system of claim 1, wherein the time at which the device can be replaced or repaired is based at least in part upon an analysis of a cost of replacing or repairing the device versus a benefit of operating the device at the reduced performance level.

11. The system of claim 1, wherein the time at which the device can be replaced or repaired is based at least in part upon a scheduled maintenance of another industrial business operation.

12. The system of claim 1, wherein the compliance component is further configured to execute another industrial business operation at an increased performance level in response to a determination by diagnostics and prognostics component that the device is not in compliance with the industrial business operation.

13. The system of claim 1, wherein the compliance device monitors the internet for alternative compatible devices to the device and selects a replacement device from the alternative compatible devices that improves at least one operational objective of the industrial business operation as compared to the device.

14. The system of claim 1, wherein the compliance device employs a web crawler to monitor the internet for alternative compatible devices to the device.

15. A method for self-sensing a device connected to a safety input in an industrial business operation, comprising:
    receiving a signal from a device, wherein the signal relates to a test signal;
    determining compliance of the device with the industrial business operation based on the Signal;
    executing the industrial business operation at a reduced performance level in response to a determination that the device is not in compliance with the industrial business operation, wherein the device is not compliant due to degradation and the reduced performance level is selected to alter a predicted rate of degradation of the device to a rate that allows for the device to survive until a time at which the device can be replaced or repaired.

16. A non-transitory computer readable medium comprising computer executable instructions that, in response to execution, cause at least one computing device to perform operations for self-sensing a device connected to a safety input in an industrial business operation, comprising:

receiving a signal from the device, wherein the signal relates to a test signal;

determining compliance of the device with the industrial business operation based on the signal;

executing the industrial business operation at a reduced performance level in response to a determination that the device is not in compliance with the industrial business operation, wherein the device is not compliant due to degradation and the reduced performance level is selected to alter a predicted rate of degradation of the device to a rate that allows for the device to survive until a time at which the device can be replaced or repaired.

17. A system for self-sensing a device connected to a safety input in an industrial business operation, comprising:

means for receiving a signal from a device, wherein the signal relates to a test signal;

means for determining compliance of the device with the industrial business operation based on the signal;

means for executing the industrial business operation at a reduced performance level in response to a determination that the device is not in compliance with the industrial business operation, wherein the device is not compliant due to degradation and the reduced performance level is selected to alter a predicted rate of degradation of the device to a rate that allows for the device to survive until a time at which the device can be replaced or repaired.

18. An industrial controller in an industrial business operation, comprising:

a compliance component configured to receive an input from a device connected to a safety input, wherein the input relates to a test signal;

a diagnostics and prognostics component configured to determine compliance of the device with the industrial business operation based on the input;

the compliance component is further configured to execute the industrial business operation at a reduced performance level in response to a determination by diagnostics and prognostics component that the device is not in compliance with the industrial business operation, wherein the device is not compliant due to degradation and the reduced performance level is selected to alter a predicted rate of degradation of the device to a rate that allows for the device to survive until a time at which the device can be replaced or repaired.

* * * * *